United States Patent
Lorin

(10) Patent No.: US 11,018,576 B2
(45) Date of Patent: May 25, 2021

(54) METHOD AND DEVICE FOR DECREASING THE POWER SUPPLY VOLTAGE OF A C-TYPE USB RECEIVER DEVICE SUPPORTING A USB POWER DELIVERY MODE

(71) Applicant: STMicroelectronics (Grenoble 2) SAS, Grenoble (FR)

(72) Inventor: Christophe Lorin, Montbonnot (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 23 days.

(21) Appl. No.: 16/379,461

(22) Filed: Apr. 9, 2019

(65) Prior Publication Data

US 2019/0238052 A1    Aug. 1, 2019

Related U.S. Application Data

(63) Continuation-in-part of application No. 16/111,933, filed on Aug. 24, 2018.

(30) Foreign Application Priority Data

Aug. 25, 2017   (FR) ........................ 1757877
Apr. 17, 2018   (FR) ........................ 1853349

(51) Int. Cl.
 *H02M 3/06*   (2006.01)
 *H02M 3/07*   (2006.01)
 *G06F 1/26*   (2006.01)
 *H02M 1/00*   (2006.01)

(52) U.S. Cl.
 CPC ............. *H02M 3/07* (2013.01); *G06F 1/266* (2013.01); *H02M 3/06* (2013.01); *H02M 2001/0025* (2013.01)

(58) Field of Classification Search
 CPC ........................................................ H02M 3/07
 USPC ........................................................ 307/109
 See application file for complete search history.

(56) References Cited

U.S. PATENT DOCUMENTS

| | | | |
|---|---|---|---|
| 7,538,535 | B2 | 5/2009 | McDonald et al. |
| 8,860,595 | B1 | 10/2014 | Fan et al. |
| 2003/0210022 | A1 | 11/2003 | Takemura et al. |
| 2014/0369085 | A1 | 12/2014 | Motoki et al. |
| 2015/0277527 | A1 | 10/2015 | Liu |

(Continued)

FOREIGN PATENT DOCUMENTS

| | | |
|---|---|---|
| CN | 106059335 A | 10/2016 |
| CN | 106463952 A | 2/2017 |

(Continued)

*Primary Examiner* — Rexford N Barnie
*Assistant Examiner* — Dru Parries
(74) *Attorney, Agent, or Firm* — Slater Matsil, LLP

(57) ABSTRACT

A USB source device, supporting USB Power Delivery mode and coupled to a USB receiver device, includes a power converter delivering a supply voltage and a capacitive network coupled to the power converter. A method for managing the supply voltage on an output power supply pin of the USB source device includes discharging the capacitive network so as to reduce the supply voltage in response to a request to reduce the supply voltage by the USB receiver device to a target voltage. The method also includes delivering, to the power converter, a setpoint voltage for the supply voltage, a value of the setpoint voltage being reduced non-linearly so as to keep a temporal variation of the setpoint voltage lower than that of the supply voltage.

16 Claims, 3 Drawing Sheets

(56) References Cited

U.S. PATENT DOCUMENTS

| | | |
|---|---|---|
| 2015/0340890 A1 | 11/2015 | Yao et al. |
| 2015/0357928 A1 | 12/2015 | Itakura |
| 2016/0116928 A1 | 4/2016 | Motoki |
| 2016/0308452 A1 | 10/2016 | Motoki |
| 2017/0264204 A1 | 9/2017 | Motoki |
| 2017/0358994 A1 | 12/2017 | Ueno et al. |
| 2018/0013300 A1 | 1/2018 | Yao et al. |
| 2018/0183340 A1 | 6/2018 | Waters |
| 2018/0316272 A1 | 11/2018 | Yu et al. |
| 2019/0229626 A1 | 7/2019 | Phadke |

FOREIGN PATENT DOCUMENTS

| | | |
|---|---|---|
| CN | 107209539 A | 9/2017 |
| CN | 107852099 A | 3/2018 |
| CN | 210201551 U | 3/2020 |
| EP | 3200335 A1 | 8/2017 |
| WO | 2015054539 A1 | 4/2015 |
| WO | 2017008289 A1 | 1/2017 |

FIG.5

| Vc | Vci | Nstep2 (R=120 ohm, C=1000 µF) |
|---|---|---|
| 20 | 15 | 1130 |
| 15 | 12 | 877 |
| 12 | 9 | 1130 |
| 9 | 5 | 2309 |

METHOD AND DEVICE FOR DECREASING THE POWER SUPPLY VOLTAGE OF A C-TYPE USB RECEIVER DEVICE SUPPORTING A USB POWER DELIVERY MODE

CROSS-REFERENCE TO RELATED APPLICATIONS

This application claims priority to French Patent Application No. 1853349, filed on Apr. 17, 2018, and is a continuation-in-part of U.S. application Ser. No. 16/111,933, filed Aug. 24, 2018, which claims priority to French Patent Application No. 1757877, filed on Aug. 25, 2017. All of the above applications are hereby incorporated herein by reference.

TECHNICAL FIELD

Modes of implementation and embodiments of the invention relate a method and device for decreasing the power supply voltage of a receiver device, e.g., a USB device.

BACKGROUND

In theory, USB devices supporting USB Power Delivery mode make it possible to transmit, via output power supply pins commonly known to those skilled in the art under the acronym VBUS, a power of up to 100 W with a maximum voltage of 20 V and a maximum current of 5 A.

Therefore, a USB source device supporting USB PD mode and delivering a first power to a USB receiver device is capable of delivering, in response to a power change request by the USB receiver device, a second power different from the first power.

If the requested second power is lower than the first power, the USB source device is configured to produce, on the VBUS output power supply pin, a second voltage corresponding to the second power in place of a first voltage corresponding to the first power. The second voltage is generally lower than the first voltage.

Generally, the second voltage is produced by reducing the first voltage by way of discharging decoupling capacitors and regulating the voltage delivered on the VBUS output power supply pin within a standardized production period, commonly known to those skilled in the art under the abbreviation tSrcReady (Source Ready time), namely generally equal to 270 ms.

However, such a reduction of the first voltage generally leads to an undershoot of the voltage delivered on the VBUS output power supply pin.

If this voltage delivered on the VBUS output power supply pin drops below a lower threshold for the validation of the USB source device, commonly known to those skilled in the art under the abbreviation vSrcValid_lo, there is a risk that the USB receiver device will inadvertently stop operating.

In addition, if the rate of the regulation of the delivered voltage becomes greater than that of the reduction of the delivered voltage linked to the discharging of the decoupling capacitors, the regulation is saturated, making the USB source device switch to a standby mode for a blanking time.

However, as the discharging of the capacitive network continues to make the delivered voltage decrease while the USB source device is in standby mode, and as the regulation will be reactivated only at the end of the blanking time, there is a risk of the value of the delivered voltage dropping below the threshold vSrcValid_lo before the regulation is reactivated or not being able to reach the target voltage before the end of the standardized production period tSrcReady.

One common solution consists in producing a constant current for discharging the voltage delivered on the output power supply pin, but such a solution requires the constant current to be adjusted for each application of the USB source device.

Another common solution provides for linear regulation of the voltage delivered on the output power supply pin and for discharging of the decoupling capacitors through fixed resistors.

However, in order to maintain operation of the regulation, this solution requires the use of small resistors, thereby increasing the consumption of the USB source device.

SUMMARY

Modes of implementation and embodiments of the invention relate to universal serial bus (USB) devices. Particular embodiments relate to universal serial bus devices supporting USB Power Delivery mode, commonly known to those skilled in the art under the acronym USB PD. For example, embodiments relate to the adjustment of the voltage transmitted on a USB cable linking what is termed a USB source device to what is termed a USB receiver device.

Embodiments can provide a low-complexity and low-consumption technical solution that makes it possible to ensure correct operation of a USB source device in response to a request to reduce the voltage delivered on an output power supply pin and to avoid a potential undershoot of the delivered voltage.

According to one aspect, what is proposed is a method for managing the supply voltage on an output power supply pin of a USB source device supporting USB Power Delivery mode and coupled to a USB receiver device. The USB source device includes a power converter delivering the supply voltage and a capacitive network coupled to the power converter.

The method includes, in response to a request to reduce the supply voltage by the USB receiver device to a target voltage, discharging the capacitive network so as to reduce the supply voltage, and delivering, to the power converter, a setpoint voltage for the supply voltage, the value of the setpoint signal being reduced non-linearly so as to keep the temporal variation of the setpoint voltage lower than that of the supply voltage.

Such a method advantageously makes it possible to ensure that, during production of the target voltage, the rate of the regulation of the supply voltage is lower than the reduction of the supply voltage as a function of the discharging of the capacitive network, without additional implementation of the USB source device, such as a programmable current source.

As a result, the regulation of the supply voltage is operational during production of the target voltage, so as to avoid an undershoot of the supply voltage or even a disconnection of the USB receiver device.

Furthermore, the non-linear reduction of the setpoint voltage advantageously makes it possible to use discharging resistors having higher values, so as to reduce the consumption of the USB source device.

According to one mode of implementation, the value of the setpoint voltage is reduced incrementally to the target voltage, the step between two adjacent increments being set, and the duration of each increment being equal to the product of a set duration and a variable first number.

By way of non-limiting example, each variable first number may be determined on the basis of the set duration, of the setpoint voltage and of the step.

As a variant, the value of the setpoint voltage may for example be able to be selected from among several predetermined values of the supply voltage, the value of the target voltage being one of the predetermined values, and the value of the setpoint signal may for example be reduced incrementally to the target voltage. The increments correspond respectively to the predetermined values contained between the value of the setpoint voltage and the target voltage. The duration of each increment is equal to the product of a set duration and a variable second number. Plus, the variable second number is determined on the basis of the current setpoint voltage, of the predetermined value immediately lower than the current setpoint voltage and of a set duration.

According to another mode of implementation, the predetermined values of the supply voltage are 20 V, 15 V, 12 V, 9 V and 5 V.

According to another aspect, what is proposed is a controller for managing the supply voltage on an output power supply pin of a USB source device supporting USB Power Delivery mode and coupled to a USB receiver device, the USB source device including a power converter delivering the supply voltage and a capacitive network coupled to the power converter. The controller includes a discharging circuit configured, in response to a request to reduce the supply voltage by the USB receiver device to a target voltage, to discharge the capacitive network so as to reduce the supply voltage. The controller also includes a control circuit configured, in response to the request, to deliver, to the power converter, a setpoint voltage for the supply voltage, and to reduce the value of the setpoint signal non-linearly so as to keep the temporal variation of the setpoint voltage lower than that of the supply voltage.

According to one embodiment, the control circuit is configured to reduce incrementally to the target voltage, the step between two adjacent increments being set, and the duration of each increment being equal to the product of a set duration and a variable first number.

By way of non-limiting indication, the control circuit may furthermore be configured to determine the variable number on the basis of the set duration, of the current setpoint voltage and of the step.

According to another embodiment, the value of the setpoint signal is able to be selected from among several predetermined values of the supply voltage, and the value of the target voltage is one of the predetermined values.

The control circuit is configured to reduce the value of the setpoint signal incrementally to the target voltage. The increments correspond respectively to the predetermined values contained between the value of the setpoint voltage and the target voltage. The duration of each increment is equal to the product of a set duration and a variable second number. Additionally, the control circuit is configured to determine the variable second number on the basis of the current setpoint voltage, of the predetermined value immediately lower than the current setpoint voltage and of a set duration.

According to yet another embodiment, the predetermined values of the supply voltage are 20 V, 15 V, 12 V, 9 V and 5 V.

By way of non-limiting example, the controller may be formed in an integrated manner.

According to another aspect, what is proposed is a USB source device supporting USB Power Delivery mode and including at least one controller as defined above.

The USB source device may be for example a USB Type-C source device.

According to yet another aspect, what is proposed is an electronic appliance, such as a cellular mobile telephone, tablet or laptop computer, including at least one USB source device as defined above.

BRIEF DESCRIPTION OF THE DRAWINGS

Other advantages and features of the invention will become apparent on examining the detailed description of wholly non-limiting modes of implementation and embodiments and the appended drawings, in which:

FIGS. 1 to 5 schematically illustrate modes of implementation and various embodiments of the invention.

DETAILED DESCRIPTION OF ILLUSTRATIVE EMBODIMENTS

Figure 1:
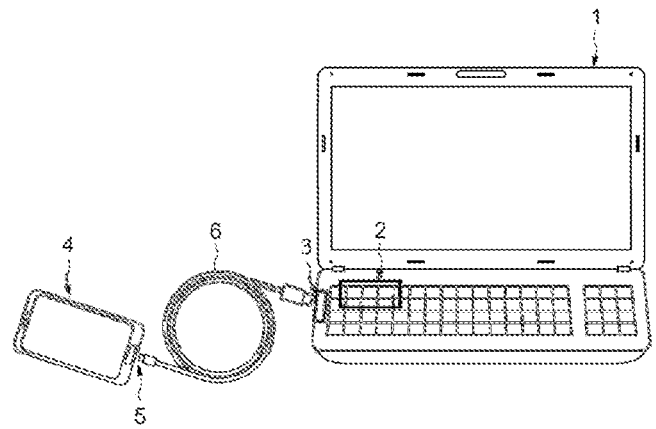

Reference 1 in FIG. 1 denotes an electronic appliance, in this case for example a laptop computer, including what is termed a USB source device 2 supporting USB Power Delivery mode and for example compatible with the USB 3.1 standard, and including for example a reversible USB connector 3 that does not have a specific plug-in direction, commonly known to those skilled in the art under the name Type-C.

In this context, a USB device (e.g., source device, connector, cable, and so on) refers to a device that is compatible with any USB standard in effect as of the effective filing date of this patent. The same applies for any other standard that may be referenced in this document.

The Type-C connector 3 is linked, via a Type-C USB cable 6, to what is termed a USB receiver device 4, also supporting USB Power Delivery mode, in this case for example a mobile telephone of smartphone type, also including a USB Type-C connector 5.

Figure 2:
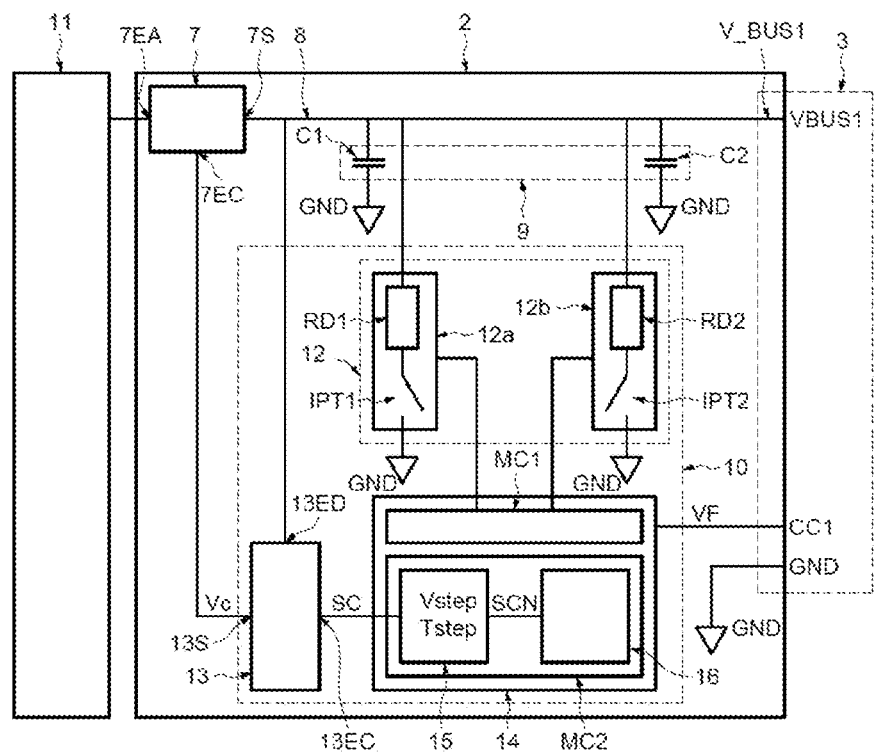

The USB source device 2 and the USB receiver device 4 each include at least one channel configuration pin CC1, at least one output supply voltage pin VBUS1 and at least one ground pin GND (FIG. 2). The pins of the same kind are linked to one another by the USB cable 6.

It should be noted that the USB source and receiver devices mentioned above are illustrated by way of non-limiting example. The USB source device 2 may for example operate as USB receiver device, whereas the USB receiver device 4 may for example operate as USB source device in certain cases.

Reference is now made to FIG. 2 in order to illustrate, in greater detail, an exemplary embodiment of the USB source device 2 furthermore including an electric power converter 7, a power supply line 8, a capacitive network 9 and a power supply controller 10.

The electric power converter 7 is for example an AC/DC (flyback) converter.

A power supply input 7EA of this converter 7 is coupled to an electric power supply network ii operating as power source for the USB source device 2.

A control input 7EC of this converter 7 is coupled to the power supply controller 10.

An output 7S of this converter 7 is coupled to the at least one output power supply pin VBUS1 via the power supply line 8.

The electric power converter 7 is configured to deliver, to the power supply line 8, a supply voltage V_BUS1 under the control of the power supply controller 10.

The capacitive network 9 includes a first capacitor C1 coupled between the output 7S of the electric power converter 7 and ground GND, and a second capacitor C2 coupled between the output power supply pin VBUS1 and ground GND.

The power supply controller 10 is produced in an integrated manner, for example in the form of a microcontroller, and includes discharging circuit 12, feedback circuit 13 and control circuit 14.

The discharging circuit 12 includes a first discharging stage 12a, coupled between the output S1 of the electric power converter 7 and ground GND and configured to discharge the first capacitor C1 under the control of the control circuit 14, and a second discharging stage 12b, coupled between the at least one output power supply pin V_BUS1 and ground GND and configured to discharge the second capacitor C2 under the control of the control circuit 14.

By way of example, the first discharging stage 12a includes a first discharging resistor RD1 and a first switch IPT1 under the control of the control circuit 14, and the second discharging stage 12b includes a second discharging resistor RD2 and a second switch IPT2 under the control of the control circuit 14.

Each of the first and second switches IPT1, IPT2 may for example be produced in the form of a transistor and is configured to be in its on state under the control of the control circuit 14 upon the discharging of the capacitive network 9.

The feedback circuit 13 includes a detection input 13ED coupled to the output 7S of the electric power converter 7 and intended to receive the supply voltage V_BUS1 delivered by the electric power converter 7, a control input 13EC coupled to the control circuit 14 and intended to receive a setpoint voltage Vc, and an output 13S coupled to the control input 7EC of the electric power converter 7.

The feedback circuit 13 is configured to deliver, to the electric power converter 7, a feedback voltage on the basis of a comparison between the supply voltage V_BUS1 and the setpoint voltage Vc, so as to regulate the supply voltage V_BUS1 towards the setpoint voltage Vc.

By way of non-limiting indication, the feedback circuit 13 may include at least one of a variable-resistance voltage divider bridge, a controllable current source, an opto-coupling device, or a control loop known to those skilled in the art.

The control circuit 14 is coupled to at least one channel configuration pin CC1 and includes a first control module MC1 coupled to the first and second discharging stages 12a and 12b and configured to control the discharging thereof, and a second control module MC2 coupled to the control input 7EC of the electric power converter 7 and configured to deliver, to the feedback circuit 13, the setpoint signal SC so as to drive the regulation of the supply voltage V_BUS1 via the feedback circuit 13.

The second control module MC2 includes a digital-to-analog converter 15 (DAC) configured to deliver the setpoint voltage Vc under the control of a control signal SC and a control stage 16 configured to deliver, to the digital-to-analog converter 15, the control signal SC so as to drive the variation of the setpoint signal SC.

When the USB receiver device 4 (FIG. 1) requests a supply power lower than the supply voltage V_BUS1 delivered by the USB source device 2, the USB receiver device 4 is configured to deliver, to the control circuit 14 of the USB source device 2 via the channel configuration pin CC1, a request to reduce the supply voltage V_BUS1 to a target voltage VF.

The first control module MC1 is configured to discharge the capacitive network 9 so as to reduce the supply voltage V_BUS1, and the second control module MC2 is configured to drive the regulation of the setpoint voltage that the supply voltage V_BUS1 has to follow.

By way of non-limiting example, the supply voltage V_BUS1 before the reduction request is 20 V, and the target voltage is 5 V.

Depending on the resolution of the digital-to-analog converter 15, a minimum voltage variation step Vstep (voltage step) is obtained at its output, corresponding to the minimum variation able to be achieved by the digital-to-analog converter 15, in this case for example Vstep=12.5 mV. The time necessary to perform a minimum voltage variation step Vstep, in other words a minimum time variation step (time step), is determined by a clock signal of the power supply controller 10, in this case for example with Tstep=1/32768 s. These values to Tstep and Vstep give a maximum dV/dt of 409 V/s.

One common solution from the prior art consists in linearly reducing the value of the setpoint voltage Vc that the supply voltage V_BUS1 has to follow.

That being the case, in order to maintain the operation of the feedback circuit 13, the temporal variation of the setpoint voltage Vc, in other words the time derivative of the setpoint voltage Vc, has to be lower than the rate of variation of the supply voltage V_BUS1.

Since the supply voltage V_BUS1 continues to decrease, it is the target voltage VF that is critical for ensuring the correct operation of the feedback circuit 13. We therefore have $$\frac{dVc}{dt} < \frac{VF}{RC}$$

where R is the equivalent resistance of the discharging resistors RD1 and RD2 of the first discharging stage 12a and of the second discharging stage 12b, and C is the equivalent capacitance of the capacitors C1 and C2 of the capacitive network 9.

For what is termed the flyback converter 7 with VF=5 V, C=1000 μF and $$\frac{dVc}{dt} = 15 \text{ V}/200 \text{ ms},$$

the equivalent resistance R is less than 66 ohms.

It should be noted that the converter 7 may also be a switch-mode power supply or a DC/DC (buck) converter, known to those skilled in the art. In a case where VF=5 V, C=200 μF and $$\frac{dVc}{dt} = 15 \text{ V}/200 \text{ ms},$$

the equivalent resistance R is less than 330 ohms.

With these values of the equivalent resistance R, the discharge current at the start of discharging of the capacitive network 9 and the consumption of the USB source device 2 are high.

Thus, according to an embodiment, the power supply controller 10 is configured, upon receiving the request to reduce the supply voltage V_BUS1, to perform at least one of the following steps: discharge the capacitive network 9 so as to reduce the supply voltage V_BUS1, and deliver, to the power converter 7, the setpoint voltage Vc that the supply voltage V_BUS1 has to follow.

The value of the setpoint voltage Vc is reduced non-linearly (e.g. to have a pseudo-exponential shape) in a constrained amount of time. In some embodiments, the amount of time is determined by the application, e.g., by the USP Power Delivery mode.

More precisely, the value of the setpoint voltage Vc is reduced incrementally to the target voltage VF.

The step between two increments is set. The duration of each increment is variable and equal to the product of a set duration and a variable first number.

The step between two increments is in this case the minimum voltage variation step Vstep. The set duration is in this case the minimum time variation step Tstep.

The variable first number Nstep1 is determined on the basis of the set duration Tstep, of the current setpoint voltage Vc and of the step Vstep.

We have, for example $$Nstep1 = \left\lceil \frac{Tstep * R * C}{Vstep * Vc} \right\rceil$$

where the symbol ⌈ ⌉ represents the notation for the ceiling integer part.

It should be noted that the setpoint voltage decreases as a function of time. As a result, the variable first number Nstep1 increases as a function of time.

Figure 3:
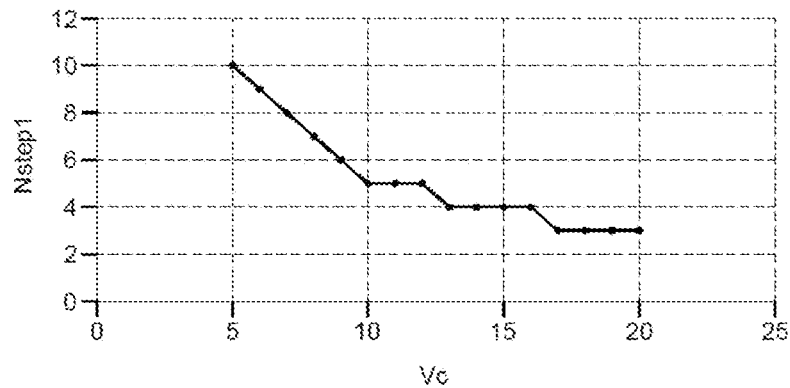

FIG. 3 illustrates an exemplary variation of the variable first number Nstep1 as a function of the setpoint voltage Vc.

When the value of the setpoint voltage Vc is greater than 17 V, the first number Nstep1 is equal to 3. The value of the first number Nstep1 reaches 10 when the setpoint voltage Vc is equal to the target voltage VF, that is to say 5 V.

As illustrated in FIG. 3, the rate of variation of the setpoint voltage Vc at the start of discharging of the capacitive network 9 is higher. More precisely, the setpoint voltage Vc is reduced by a minimum voltage variation step Vstep after three minimum time variation steps Tstep.

By contrast, the rate of variation of the setpoint voltage Vc at the end of discharging of the capacitive network 9 is not as high, and it is necessary to wait ten minimum time variation steps Tstep to have a reduction of one minimum voltage variation step Vstep in the setpoint voltage Vc. In other words, it is advantageously possible to have a lower discharge current at the end of discharging.

A larger equivalent resistance R, for example of 120 ohms, is therefore advantageously able to be used in a configuration for example with what is termed a flyback converter, so as to reduce the consumption of the USB source device.

Figure 4:
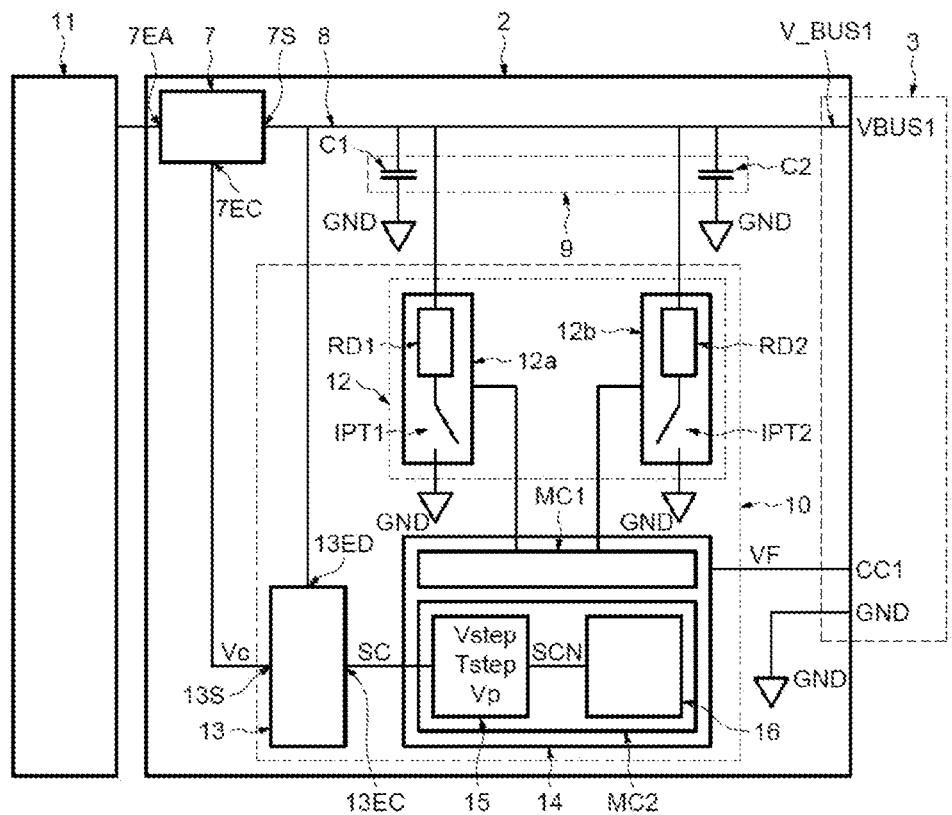

As a variant, the second control mode MC2 of the USB source device 2 may include (FIG. 4), instead of the digital-to-analog converter 15, a voltage divider 17, known to those skilled in the art, so as to deliver the setpoint voltage Vc whose value is able to be selected from among a series of predetermined values Vp of the supply voltage V_BUS1.

These predetermined values Vp of the supply voltage V_BUS1 are for example 20 V, 15 V, 12 V, 9 V and 5 V, in accordance with the USB 3.1 standard, and the target voltage VF is for example also selected from these predetermined values.

In this case, the control circuit 10 is configured to reduce the value of the setpoint voltage Vc incrementally to the target voltage VF.

The increments correspond respectively to the predetermined values contained between the setpoint value Vc and the target voltage VF.

For example, for a request to reduce the supply voltage V_BUS1 from 20 V to 9 V, it is necessary to decrease the value of the setpoint voltage Vc from 20 V to 15 V, and then from 15 V to 12 V, and lastly from 12 V to 9 V. The corresponding increments are 20 V, 15 V, 12 V and 9 V.

The duration of each increment is variable and equal to the product of a set duration and a variable second number.

In other words, the current setpoint voltage value Vc is shifted to the predetermined value Vci immediately lower than the current setpoint voltage Vc at the end of the duration.

The set duration may also for example be the minimum time variation step Tstep.

The variable second number Nstep2 is determined on the basis of the current setpoint voltage Vc, of the predetermined value Vci immediately lower than the current setpoint voltage Vc and of the set duration Tstep.

The variable second number Nstep2 is calculated for example as follows:

$$Nstep2 = \frac{R * C * \ln\left(\frac{Vc}{Vci}\right)}{Tstep}$$

where R is the equivalent resistance of the discharging resistors RD1 and RD2 of the first discharging stage 12a and of the second discharging stage 12b, and C is the equivalent capacitance of the capacitors C1 and C2 of the capacitive network 9.

With for example R=120 ohms and C=1000 µF, it is possible to find, in FIG. 5, the calculated values of the variable second number Nstep2.

If the current setpoint voltage Vc is 20 V and the target voltage is 5 V, it is first of all necessary to wait 1130 minimum time variation steps Tstep before shifting to the predetermined value Vci immediately lower than the current setpoint voltage Vc, namely 15 V.

The current setpoint voltage Vc then becomes 15 V and the variable second number Nstep2 is determined on the basis of this current setpoint value Vc, of the predetermined value Vci immediately lower than the current setpoint voltage Vc, that is to say 12 V, and of the set duration Tstep. It is then necessary to wait 887 Tstep before shifting the setpoint voltage Vc from 15 V to 12 V.

In the same way, 1130 Tstep are waited before shifting the setpoint voltage Vc from 12 V to 9 V and, lastly, 2309 Tstep are waited before shifting the setpoint voltage Vc from 9 V to 5 V.

Thus, non-linear regulation of the supply voltage on an output power supply pin of a USB source device is achieved, making it possible not only to avoid potential undershoots of the supply voltage so as to ensure correct operation of the USB source device, but also to use a larger resistance, for example 120 ohms instead of 66 ohms in the case of what is termed a flyback converter, so as to reduce consumption without making additional modifications to the structure of the USB source device. It is noted that the embodiments present a solution that prevents entering into a hiccup mode (e.g. flyback) by decreasing the output voltage by a counter. The update rate is related to the resolution of the digital-to-analog 15. To keep the feedback loop locked, the ramp down slope (e.g. shown in FIG. 3) may need to be slower than the falling time provided by the discharge circuit 12. In order to achieve this, the resistor values of the first discharge resistor RD1 and/or the second discharge resistor RD2 are selected to have a time constant lower than the equivalent pseudo-exponential shape of the ramp down slope (e.g. shown in FIG. 3). In the embodiments described above, the first discharge resistor RD1 and the second discharge resistor RD2 are located outside of the electric power converter 7, thus limiting power dissipation on the die.

What is claimed is:

1. A method for managing a supply voltage on an output power supply pin of a USB source device supporting USB Power Delivery mode and coupled to a USB receiver device, the USB source device comprising a power converter delivering the supply voltage and a capacitive network coupled to the power converter, the method comprising:
    discharging the capacitive network so as to reduce the supply voltage in response to a request to reduce the supply voltage by the USB receiver device to a target voltage; and
    delivering, to the power converter, a setpoint voltage for the supply voltage, a value of the setpoint voltage being reduced non-linearly so as to keep a temporal variation of the setpoint voltage lower than a temporal variation of the supply voltage, wherein the value of the setpoint voltage is reduced incrementally to the target voltage, a step between two adjacent decrements being set, and a duration of each decrement being equal to a product of a set duration and a variable first number, and wherein each variable first number is determined based on the set duration, a current setpoint voltage, and the step between two adjacent decrements.

2. The method of claim 1, wherein the temporal variation of the setpoint voltage has a pseudo-exponential shape.

3. The method of claim 1, wherein the value of the setpoint voltage is selected from among several predetermined values of the supply voltage, the value of the target voltage being one of the predetermined values, and the value of the setpoint voltage being reduced incrementally to the target voltage.

4. A method for managing a supply voltage on an output power supply pin of a USB source device supporting USB Power Delivery mode and coupled to a USB receiver device, the USB source device comprising a power converter delivering the supply voltage and a capacitive network coupled to the power converter, the method comprising:
    discharging the capacitive network so as to reduce the supply voltage in response to a request to reduce the supply voltage by the USB receiver device to a target voltage; and
    delivering, to the power converter, a setpoint voltage for the supply voltage, a value of the setpoint voltage being reduced non-linearly so as to keep a temporal variation of the setpoint voltage lower than a temporal variation of the supply voltage, wherein the value of the setpoint voltage is selected from among several predetermined values of the supply voltage, the value of the target voltage being one of the predetermined values, and the value of the setpoint voltage being reduced incrementally to the target voltage, and wherein decrements corresponding respectively to the predetermined values contained between the value of the setpoint voltage and the target voltage, a duration of each increment being equal to a product of a set duration and a variable second number that is determined based on a current setpoint voltage, a predetermined value immediately lower than the current setpoint voltage, and the set duration.

5. The method of claim 4, wherein the predetermined values of the supply voltage comprise 20 V, 15 V, 12 V, 9 V and 5 V.

6. A controller for managing a supply voltage on an output power supply pin of a USB source device supporting USB Power Delivery mode and coupled to a USB receiver device, the USB source device comprising a power converter delivering the supply voltage and a capacitive network coupled to the power converter, the controller comprising:
    a discharging circuit configured to, in response to a request to reduce the supply voltage by the USB receiver device to a target voltage, discharge the capacitive network so as to reduce the supply voltage; and
    a control circuit configured to, in response to the request, deliver, to the power converter, a setpoint voltage for the supply voltage, and to reduce a value of the setpoint voltage non-linearly so as to keep a temporal variation of the setpoint voltage lower than that of the supply voltage, wherein the control circuit is configured to reduce the supply voltage incrementally to the target voltage, a step between two adjacent decrements being set, and a duration of each decrement being equal to a product of a set duration and a variable first number, and wherein the control circuit is furthermore configured to determine the variable first number based on the set duration, a current setpoint voltage, and the step between two adjacent decrements.

7. The controller according to claim 6, wherein the temporal variation of the setpoint voltage has a pseudo-exponential shape.

8. The controller according to claim 6, wherein the discharging circuit is external to the USB receiver device or the power converter.

9. The controller according to claim 6, wherein the value of the setpoint voltage is selected from among several predetermined values of the supply voltage, a value of the target voltage being one of the predetermined values of the supply voltage.

10. The controller according to claim 9, wherein the control circuit is configured to reduce the value of the setpoint voltage incrementally to the target voltage, decrements corresponding respectively to the predetermined values contained between the value of the setpoint voltage and the target voltage, a duration of each decrement being equal to a product of a set duration and a variable second number.

11. The controller according to claim 9, wherein the predetermined values of the supply voltage comprise at least one of 20 V, 15 V, 12 V, 9 V or 5 V.

12. The controller according to claim 6, wherein the controller is implemented as an integrated circuit.

13. A controller for managing a supply voltage on an output power supply pin of a USB source device supporting USB Power Delivery mode and coupled to a USB receiver device, the USB source device comprising a power converter delivering the supply voltage and a capacitive network coupled to the power converter, the controller comprising:
    a discharging circuit configured to, in response to a request to reduce the supply voltage by the USB receiver device to a target voltage, discharge the capacitive network so as to reduce the supply voltage; and a control circuit configured to, in response to the request, deliver, to the power converter, a setpoint voltage for the supply voltage, and to reduce a value of the setpoint voltage non-linearly so as to keep a temporal variation of the setpoint voltage lower than that of the supply voltage, wherein the value of the setpoint voltage is selected from among several predetermined values of the supply voltage, a value of the target voltage being one of the predetermined values of the supply voltage, wherein the control circuit is configured to reduce the value of the setpoint voltage incrementally to the target voltage, decrements corresponding respectively to the predetermined values contained between the value of the setpoint voltage and the target voltage, a duration of each decrement being equal to a product of a set duration and a variable second number, and wherein the control circuit is further configured to determine the variable second number based on a current setpoint voltage, the predetermined value immediately lower than the current setpoint voltage, and a set duration.

14. A USB source device supporting USB Power Delivery mode, the USB source device comprising:

a power converter delivering a supply voltage;

a capacitive network coupled to the power converter;

a discharging circuit configured to, in response to a request to reduce the supply voltage by a USB receiver device to a target voltage, discharge the capacitive network so as to reduce the supply voltage; and a control circuit configured to, in response to the request, deliver, to the power converter, a setpoint voltage for the supply voltage, and to reduce a value of the setpoint voltage non-linearly so as to keep a temporal variation of the setpoint voltage lower than that of the supply voltage, wherein the control circuit is configured to reduce the supply voltage incrementally to the target voltage, a step between two adjacent decrements being set, and a duration of each decrement being equal to a product of a set duration and a variable first number, and wherein the control circuit is furthermore configured to determine the variable first number based on the set duration, a current setpoint voltage, and the step between two adjacent decrements.

15. The USB source device according to claim 14, wherein the USB source device is a USB Type-C source device.

16. The USB source device according to claim 14, wherein the temporal variation of the setpoint voltage has a pseudo-exponential shape.

* * * * *